(12) United States Patent
Chambers et al.

(10) Patent No.: US 6,301,631 B1
(45) Date of Patent: Oct. 9, 2001

(54) MEMORY MAPPING METHOD FOR ELIMINATING DUAL ADDRESS CYCLES IN A PERIPHERAL COMPONENT INTERCONNECT ENVIRONMENT

(75) Inventors: Peter Chambers, Phoenix; Subramanian S. Meiyappan; Swaroop Adusumilli, both of Tempe, all of AZ (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/239,500

(22) Filed: Jan. 28, 1999

(51) Int. Cl.[7] ................................................ G06F 13/14
(52) U.S. Cl. ............................... 710/129; 710/63; 710/66
(58) Field of Search ................................. 710/126–129, 710/8–14, 62–66; 711/1–6

(56) References Cited

U.S. PATENT DOCUMENTS

| | | | |
|---|---|---|---|
| 4,234,934 | * 11/1980 | Thorsrud | 711/212 |
| 5,168,562 | * 12/1992 | Estepp et al. | 710/127 |
| 5,237,672 | * 8/1993 | Ing-Simmons et al. | 711/211 |
| 5,404,474 | * 4/1995 | Crook et al. | 711/212 |
| 5,446,845 | * 8/1995 | Arroyo et al. | 710/127 |
| 5,530,837 | * 6/1996 | Williams et al. | 711/157 |
| 5,535,349 | * 7/1996 | Boaz et al. | 711/1 |
| 5,590,287 | * 12/1996 | Zeller et al. | 710/127 |
| 5,600,814 | * 2/1997 | Gahan et al. | 711/100 |
| 5,802,392 | * 9/1998 | Epstein et al. | 710/4 |
| 5,845,153 | * 12/1998 | Sun et al. | 710/56 |
| 5,938,776 | * 8/1999 | Sicola et al. | 714/25 |

FOREIGN PATENT DOCUMENTS

98/09221 * 3/1998 (WO) ............................. G06F/12/02

* cited by examiner

*Primary Examiner*—Sumati Lefkowitz
(74) *Attorney, Agent, or Firm*—Wagner, Murabito & Hao LLP (57) ABSTRACT

A system and method that prevents address aliasing and eliminates the unnecessary clock cycle consumed by the use of a dual address cycle when using a single address cycle to transmit a target address in a computer system including target devices having addresses of different sizes, such as 32-bit and 64-bit target devices, with 32-bit and 64-bit addresses, respectively. In addition, a combination of single address cycles and dual address cycles may be used to prevent address aliasing while permitting access to the entire address spaces of the target devices. The computer system includes a bus, an initiator device coupled to the bus, a first target device coupled to the bus, and a second target device coupled to the bus. The first target device has a first address range containing a plurality of bits, and the second target device has a second address range containing a fewer number of bits than the first address range. The second address range includes addresses that are specified according to a first prescribed value for a most significant bit. The first address range includes addresses that are specified according to a second prescribed value for the most significant bit to exclude the second address range such that the initiator device can transmit the first address to the first target device without aliasing the second address with the first address. The initiator device selects either the first address range or the second address range for the target address by specifying either the first prescribed value or the second prescribed value in the target address.

38 Claims, 10 Drawing Sheets

MEMORY MAPPING METHOD FOR ELIMINATING DUAL ADDRESS CYCLES IN A PERIPHERAL COMPONENT INTERCONNECT ENVIRONMENT

TECHNICAL FIELD

The present invention pertains to the field of computer system bus architectures. More specifically, the present invention pertains to a method for optimizing address cycles in peripheral component interconnect bus systems.

BACKGROUND ART

A bus architecture of a computer system conveys much of the information and signals involved in the computer system's operation. In a typical computer system, one or more buses are used to connect a central processing unit (CPU) to a memory and to input/output devices so that data and control signals can be readily transmitted between these different components. When the computer system executes its programming, it is imperative that data and information flow as fast as possible in order to make the computer system as responsive as possible to the user. With many peripheral devices and subsystems, such as graphics adapters, full motion video adapters, small computer systems interface (SCSI) host bus adapters, and the like, it is imperative that large block data transfers be accomplished expeditiously. These applications are just some examples of peripheral devices and subsystems which benefit substantially from a very fast bus transfer rate.

Much of the computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose.

The electronics industry has, over time, developed several types of bus architectures. The PCI (peripheral component interconnect) bus architecture has become one of the most widely used and widely supported bus architectures in the industry. The PCI bus was developed to provide a high speed, low latency bus architecture from which a large variety of systems could be developed.

A PCI specification is used to establish standards to facilitate uniformity and compatibility of PCI devices operating in a PCI bus architecture. Initially, the PCI specification addressed only the use of 32-bit devices and 32-bit transactions, but the specification has since been extended to 64-bit devices and transactions.

Figure 1:
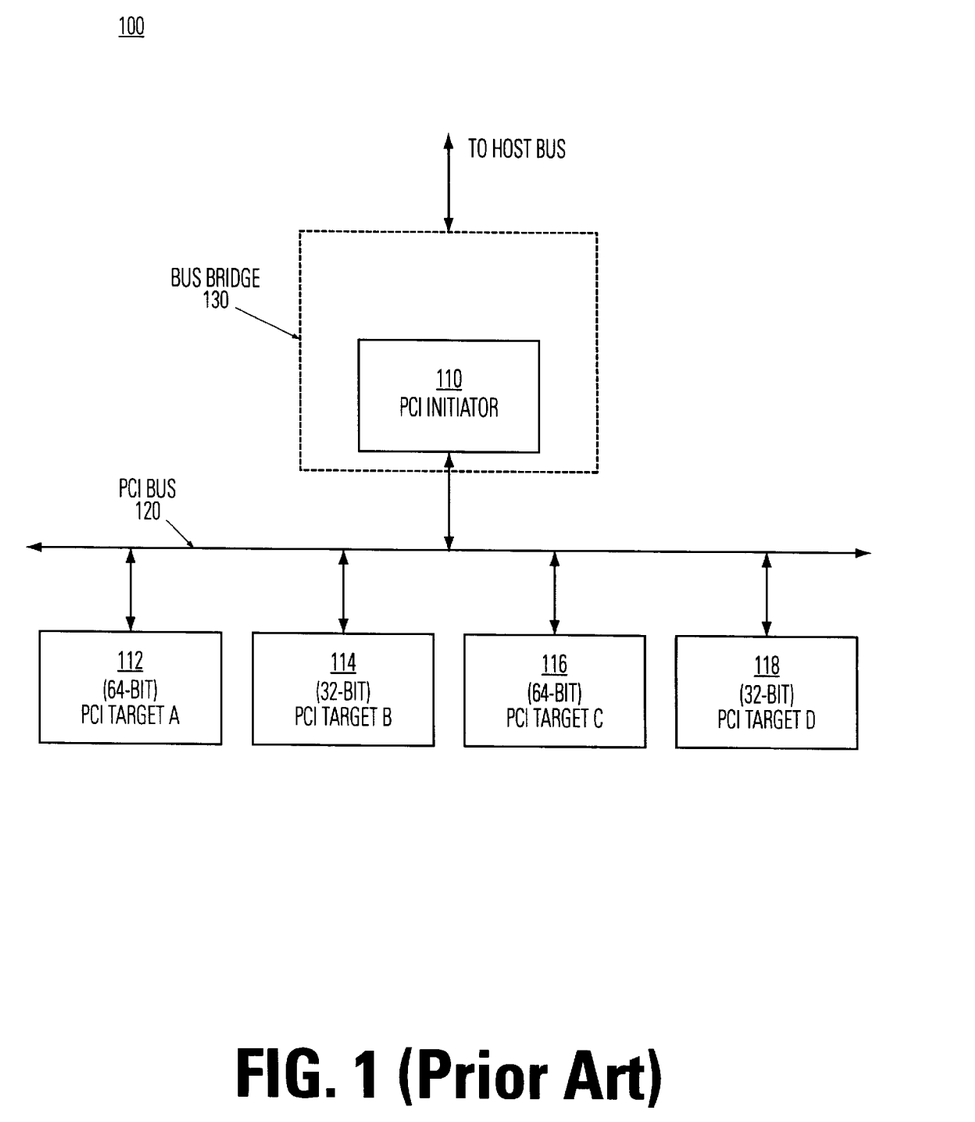
FIG. 1 is a block diagram of a simplified exemplary peripheral component interconnect (PCI) bus architecture of the prior art.

Prior Art FIG. 1 shows a simplified exemplary PCI bus architecture 100 implemented, for example, in a computer system. PCI bus 120 is coupled to PCI initiator 110. PCI bus 120 is also coupled to each of PCI target devices A 112, B 114, C 116 and D 118. PCI initiator 110 can be integrated into bus bridge 130, as shown, and bus bridge 130 in turn is used to couple PCI bus 120 to a host bus (not shown). Bus bridge 130 is typically a bidirectional bridge and is made up of numerous components; for simplicity, bus bridge 130 is shown as comprising only PCI initiator 110.

PCI bus 120 is comprised of functional signal lines, for example, interface control lines, address/data lines, error signal lines, and the like. Each of PCI target devices 112-118 are coupled to the functional signal lines comprising PCI bus 120.

With reference still to Prior Art FIG. 1, PCI targets B 114 and D 118 are 32-bit target devices. That is, PCI targets B 114 and D 118 have addresses that encompass up to 32 bits, resulting in an address range of up to four (4) gigabytes (GB) in a 32-bit memory space. Similarly, PCI targets A 112 and C 116 are 64-bit target devices, having addresses encompassing up to 64 bits, which allow an address range of up to 16 exabytes in a 64-bit memory space. In addition, PCI bus 120 is a 64-bit bus and PCI initiator 110 is a 64-bit device. Such a mix of 32-bit devices and 64-bit devices is common in today's computer systems owing to the extension of the PCI specification to 64-bit devices, and it is required that these devices function together seamlessly as well as conform to the PCI specification. Therefore, to utilize the capabilities of the computer system to their fullest extents, PCI bus architecture 100 must be capable of performing 64-bit transactions between 64-bit devices, and must also support seamless transactions between 64-bit initiator devices and 32-bit target devices.

At the time when a 64-bit initiator generates a transaction, it is not aware of the attributes of the target device; that is, it does not know whether the target is a 32-bit device or a 64-bit device. Hence, to ensure compatibility regardless of the respective ranges of the initiator and target devices, in the prior art an assumption is made that the target device is only capable of handling a 32-bit operand. Thus, the prior art technique for transmitting a 64-bit address is to represent the 64-bit address as two 32-bit operands and drive the address over the bus using dual address cycles (also known as dual address commands, DACs), one cycle to transmit each of the 32-bit operands. Because two operands are passed across the PCI bus, two PCI clock cycles are needed to complete a DAC.

Figure 2:
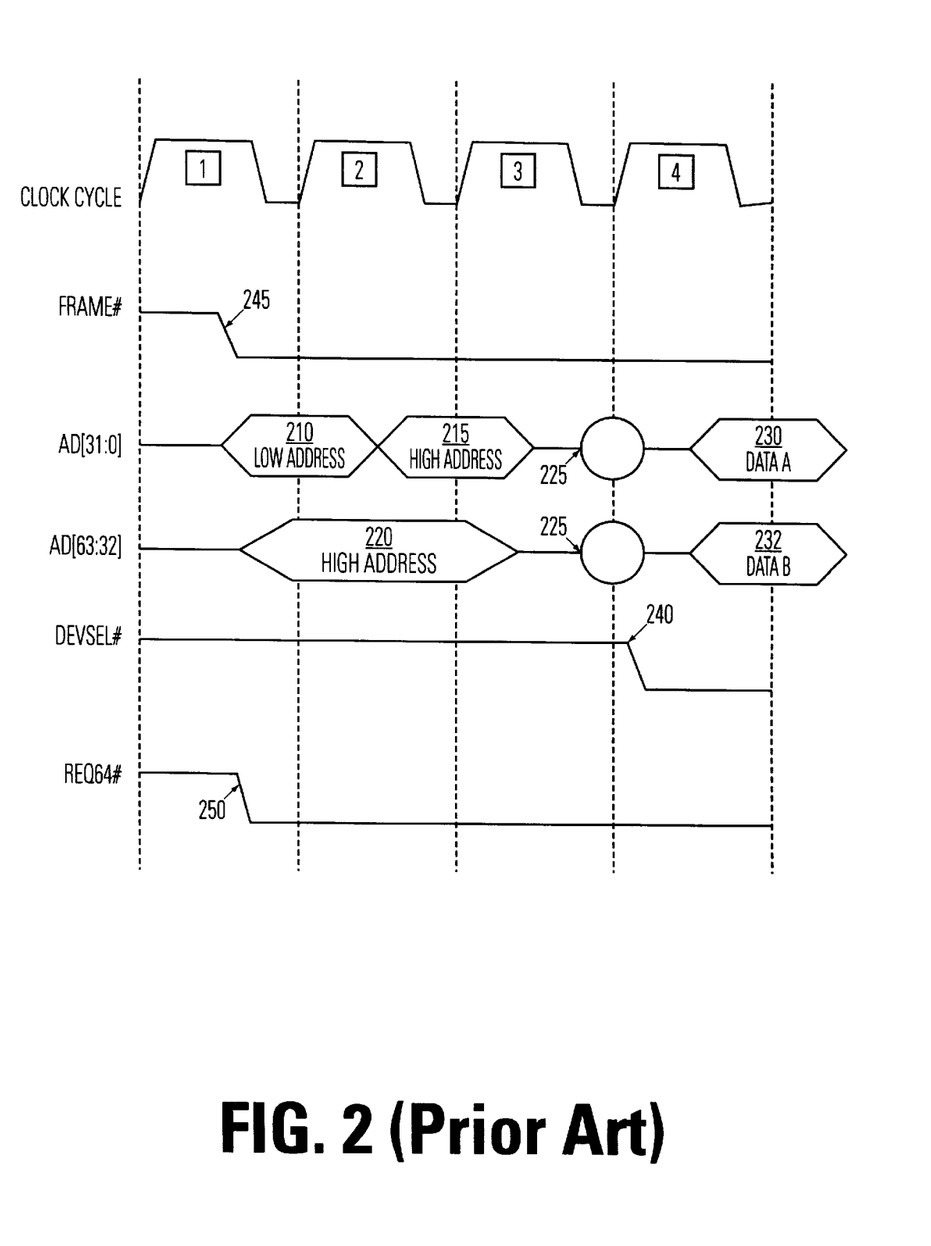
FIG. 2 illustrates a timing diagram showing the address phases of a 64-bit transaction in accordance with the prior art.

With reference now, to Prior Art FIG. 2, timing diagram 200 is provided exemplifying a simplified transaction using DACs according to the prior art. For simplicity, Prior Art FIG. 2 does not illustrate all of the signals associated with a transaction, but only shows those signals pertaining to the discussion herein. Timing diagram 200 illustrates a transaction initiated by a 64-bit initiator device over a PCI bus capable of supporting 64-bit transactions (e.g., PCI initiator 110 and PCI bus 120 of Prior Art FIG. 1).

Continuing with reference to Prior Art FIG. 2, PCI initiator 110 starts the transaction on the rising edge of PCI clock cycle 1 by asserting the FRAME# and REQ64# signals (at points 245 and 250, respectively). Generally, FRAME# is used to indicate the start of a transaction, and REQ64# to indicate that the transaction includes a 64-bit data transfer. These signals are known in the art and are as defined in the PCI specification.

In clock cycle 1, PCI initiator 110 also drives the lower portion of the address (e.g., low address 210) onto AD[31:0] and the upper portion of the address (e.g., high address 220) onto AD[63:32], and it continues to drive high address 220 onto AD[63:32] for the duration of both address phases of the DAC. During clock cycle 2, PCI initiator 110 starts the second address phase of the DAC by driving high address 215 onto AD[31:0]. All devices on the PCI bus latch these addresses, and during clock cycle 3 they decode the address. The target named by the address claims the transaction in clock cycle 4 by asserting the DEVSEL# signal (at point 240). If the transaction is a read, on the rising edge of clock cycle 4, turn-around cycles 225 are inserted in AD[31:0] and AD[63:32]. Data A 230 and data B 232 are then driven onto the bus by the target device or by the initiator device depending on the type of transaction. Thus, in the prior art a 64-bit address is divided into 32-bit operands and transmitted via a DAC, even if the target device is a 64-bit device and therefore capable of reading a 64-bit address.

The prior art is problematic because a single address cycle (or single address command, SAC) cannot be used to transmit a 64-bit address as a single 64-bit operand to a 64-bit target device in the presence of a 32-bit target device, even if the 64-bit initiator knows that the target device is a 64-bit device. In accordance with the PCI specification, when an initiator device initiates a transaction, it drives onto the PCI bus the address of the target device with which the initiator device is seeking to perform the transaction. At this stage of the transaction, all target devices on the PCI bus latch the address, and then each target device decodes the address to determine whether or not it is the intended target named by the address. Hence, if a 64-bit address is transmitted over the PCI bus in a single address cycle, each 32-bit target device on the bus, as well as each 64-bit target device, latches the address. However, the 32-bit targets will only be capable of reading a portion of the address (namely, the lower half of the address), because these devices do not have access to the upper 32 bits of the address. In the likely case in which the lower half of a 64-bit address matches the 32-bit address of a 32-bit device, that 32-bit device will erroneously assert a claim to the transaction. In the meantime, the 64-bit device that is the intended, recipient of the address will also assert a claim to the transaction after it decodes and recognizes its address, so that two devices will have asserted a claim to the same transaction.

Consider as an example a 32-bit target that is mapped into address 0000 0000 h to 0000 FFFFh in a 32-bit memory space. A 64-bit initiator then specifies an address of 0000 0001 0000 1000 h for a 64-bit target mapped into a 64-bit memory space. The 32-bit target latches the address but is only capable of reading the latter portion of the address, specifically the portion 0000 1000 h, which, from the perspective of the 32-bit target, appears to fall within the range of addresses into which the 32-bit target device is mapped. Hence, the 32-bit target responds, as does the 64-bit target. This type of error is known as address aliasing. Address aliasing causes other types of errors to occur, such as incorrect data being sent, bus contention due to multiple and simultaneous drivers, and the like. Thus, the prior art is problematic because it does not allow a SAC to be used for a 64-bit address intended for a 64-bit target device because of address aliasing. In the prior art, if a SAC is used for a 64-bit address, then address aliasing will cause a 32-bit target to respond in error.

As can be seen from Prior Art FIG. 2, two clock cycles are needed to transmit a 64-bit address to allow a 32-bit target to read both phases of the address on AD[31:0] (a 32-bit target does not have access to AD[63:32]). Thus, another disadvantage to the prior art is that two clock cycles are used to transmit a 64-bit address when, for the case in which the intended recipient is a 64-bit target device, one clock cycle would be satisfactory. Therefore, in the prior art, data transfer subsequent to the address phase is delayed by one clock cycle. In addition, during the transaction, the PCI initiator requires ownership of the PCI bus, and thus the PCI bus is not available for other transactions. Thus, in the prior art, other transactions are also delayed because a portion of the computer system's data transfer bandwidth is consumed by the unnecessary clock cycle. This disadvantage is especially significant when multiplied by the number of transactions that occur on the PCI bus.

Accordingly, what is needed is a method and/or system that reduces or eliminates the use of DACs to transmit 64-bit addresses in the presence of 32-bit targets. What is also needed is a method and/or system that addresses the above need and does not cause address aliasing and errors associated with address aliasing when a SAC is used. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a system and method which reduce or eliminate the use of DACs to transmit 64-bit addresses in the presence of 32-bit targets. The present invention also provides a system and method that address the above need and do not cause address aliasing and other errors associated with address aliasing when a SAC is used.

The present invention is a system and method for preventing address aliasing when using a single address cycle (SAC) to transmit a target address in a computer system that includes target devices having addresses of different sizes. The computer system comprises a bus, an initiator device coupled to the bus, a first target device coupled to the bus, and a second target device coupled to the bus. The first target device has a first address range comprising a plurality of bits, and the second target device has a second address range comprising a fewer number of bits than the first address range. The second address range includes addresses that are specified according to a first prescribed value for a most significant bit. The first address range includes addresses that are specified according to a second prescribed value for the most significant bit to exclude the second address range such that the initiator device can transmit the first address to the first target device without aliasing the second address with the first address. The initiator device selects either the first address range or the second address range for the target address by specifying either the first prescribed value or the second prescribed value in the target address.

In one peripheral component interconnect (PCI) compliant embodiment, the bus, the initiator device, the first target device and the second target device are PCI devices. The first target device is a 64-bit device with a 64-bit address range, and the second target device is a 32-bit device with a 32-bit address range and the most significant bit is address bit [31].

The first address range includes an upper half of a four gigabyte address space that is addressed by the first address using a single address cycle when the second prescribed value for the most significant bit is one. The first address range further includes a lower half of the four gigabyte address space that is addressed by the first address using a dual address cycle.

The second address range includes a lower half of a four gigabyte address space that is addressed by the second address using a single address cycle when the first prescribed value for the most significant bit is zero. The second address range further includes an upper half of the four gigabyte address space that is addressed by the first address using a dual address cycle (DAC), wherein all upper 32 bits of the DAC are zero.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and, each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

The present invention is a system and method that eliminate or reduce the use of dual address cycles (DACs) to transmit a target address over a bus to target devices having addresses of different sizes without address aliasing. Thus, the present invention provides a system and method which optimally utilize the data transfer bandwidth of a computer system by eliminating the unnecessary expenditure of clock cycles associated with DACs.

In the discussion of the embodiments which follow, the initiator device, target devices and bus are peripheral component interconnect (PCI) compliant devices. As such, the following discussions are provided in the context of a PCI-compliant bus system. However, it is understood that other configurations of a bus system may be used in accordance with the present invention, such as Micro Channel, EISA (Extended Industry Standard Architecture), and the like.

Figure 3:
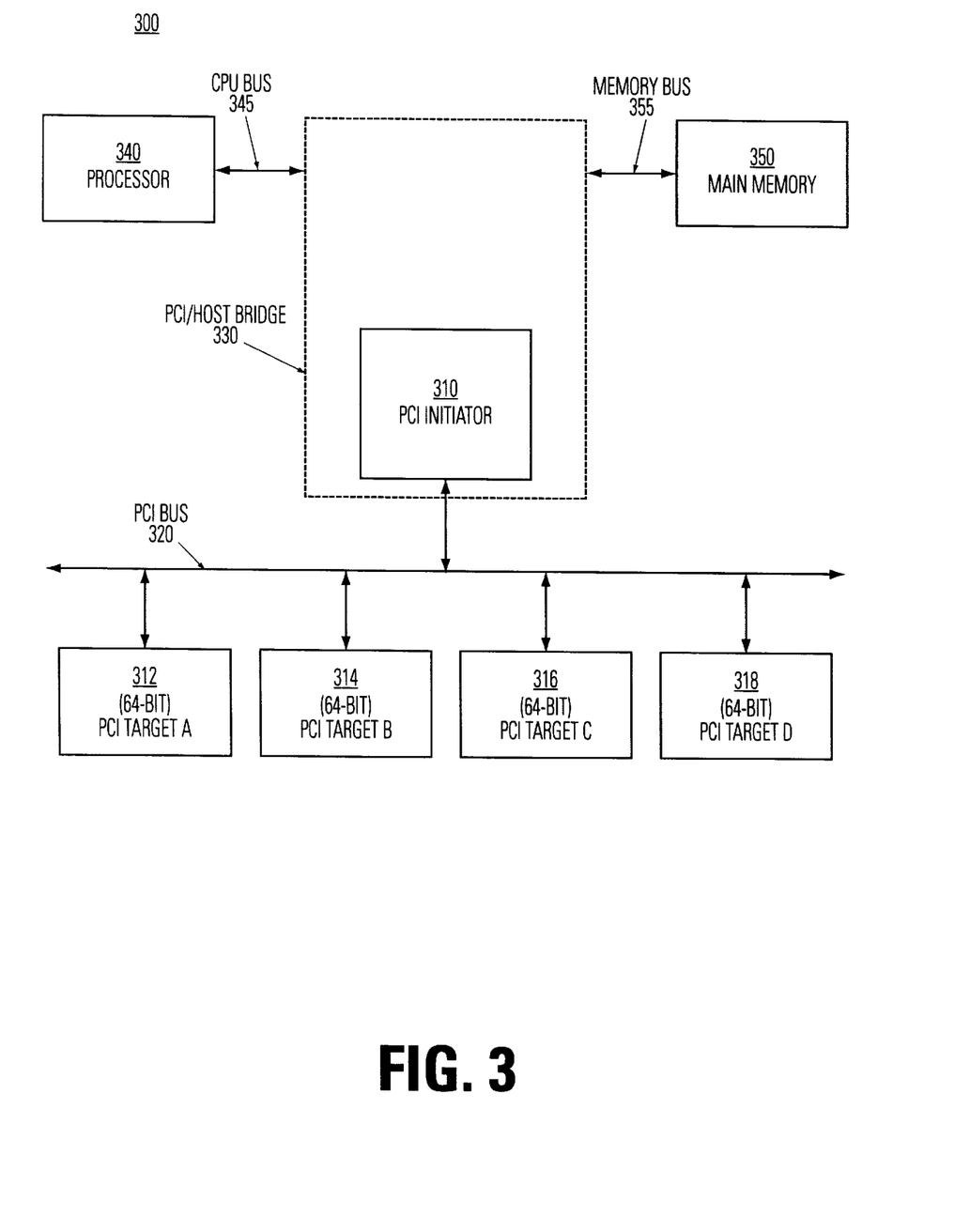
FIG. 3 is a block diagram of an exemplary PCI bus architecture implemented in a computer system in accordance with one embodiment of the present invention.

Refer now to FIG. 3, which shows an exemplary PCI bus system implemented in computer system 300 in accordance with a PCI-compliant embodiment of the present invention. The PCI bus system of computer system 300 includes PCI bus 320 coupled to PCI initiator 310. In the present embodiment, PCI initiator 310 is integrated into PCI/host bridge 330. PCI/host bridge 330 is a bidirectional PCI bridge (for simplicity, the elements of a bidirectional bridge other than PCI initiator 310 are not shown).

PCI/host bridge 330 is used to couple PCI bus 320 to processor 340 via central processing unit (CPU) bus 345 and to main memory 350 via memory bus 355.

PCI bus 320 is also coupled to 64-bit PCI target A 312 and C 316, and to 32-bit PCI target B 314 and D 318. PCI target A 312 and C 316 have addresses that encompass up to 64 bits; that is, a 64-bit address refers to an address up to 64 bits in size. Commonly, 64-bit addresses include addresses less than 64 bits in size. PCI target B 314 and D 318 have addresses that encompass up to 32 bits in size.

In accordance with the present invention, PCI initiator 310 transmits a target address using an address scheme comprising either a single address cycle (or single address command, SAC) or a dual address cycle (or dual address command, DAC). In accordance with the present invention, PCI initiator contains instructions directing it to format the target address in a prescribed manner according to whether a SAC or a DAC is used and according to the range (32-bit or 64-bit ) of the target address. In accordance with the present invention, each PCI target device on PCI bus 320 contains instructions allowing it to recognize the format used and to thus recognize whether or not a SAC or a DAC is being used and to recognize the range of the target address. As will be seen by the discussion provided below, the present invention thereby allows 32-bit and 64-bit target addresses to be sent using SACs without causing address aliasing in a system comprising both 32-bit and 64-bit target devices.

Single Address Cycles

In accordance with the present invention, SACs are used for 64-bit addresses and for 32-bit addresses. In the present embodiment, when a SAC is used for a 64-bit target address, the target address is formatted such that one of the bits in the address is assigned a prescribed value; the presence of the prescribed value in the designated bit indicates that the target address has a range of 64 bits.

In the present embodiment, in the prescribed format for the SAC address scheme, address bit [31] (AD[31]) is assigned a value of one for a 64-bit target address. Hence, when a target device, in particular a 32-bit target device (e.g., 32-bit PCI target B 314 of FIG. 3), reads the target address and detects a value of one in AD[31], then 32-bit PCI target B 314 recognizes that the target address has a 64-bit range and does not respond to the address (e.g., 32-bit PCI target B 314 does not assert a claim to the 64-bit transaction). In other words, 32-bit PCI target B 314 is looking for a target address in which AD[31] is zero (e.g., not one), and will recognize that a target address with AD[31] equal to zero is not a 64-bit address and hence must be a 32-bit address. Because 32-bit PCI target B 314 does not respond to the 64-bit address, address aliasing is prevented by the present invention, and thus 64-bit addresses can be transmitted via SACs in a system comprising a mix of 32-bit targets and 64-bit targets.

Figure 4:
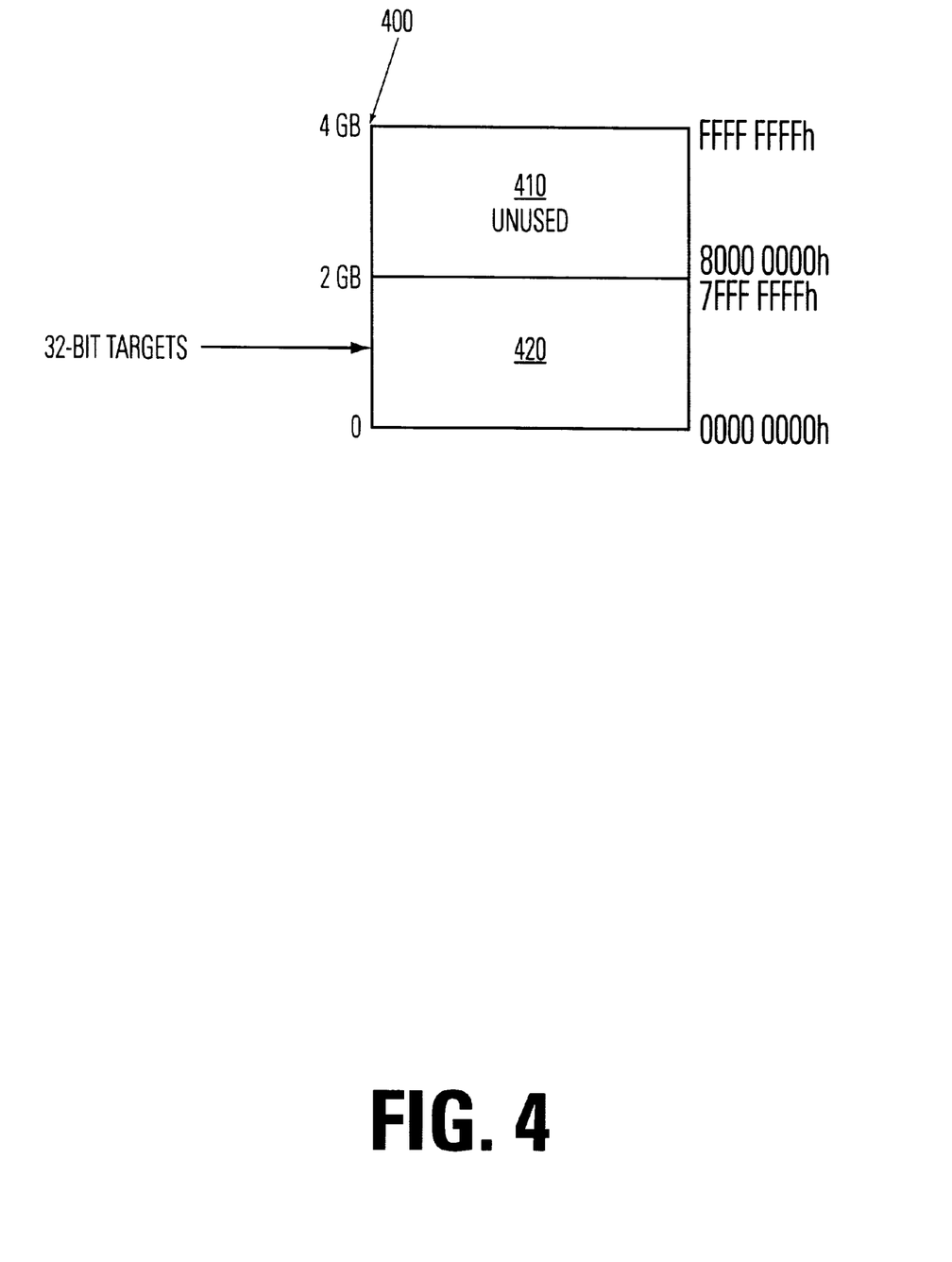
FIG. 4 is an illustration of a 32-bit memory map in accordance with one embodiment of the present invention.

With reference now to FIG. 4, memory map 400 in accordance with the present embodiment of the present invention is shown. Memory map 400 represents a 32-bit address range.

As described above, in the prescribed format for the SAC address scheme, AD[31] of a 64-bit address is purposely specified to be equal to one for 64-bit PCI targets in accordance with the present embodiment of the present invention. In the present embodiment, AD[31] is zero in 32-bit addresses and so 32-bit targets (e.g., 32-bit PCI target B 314 of FIG. 3) are mapped into region 420 of memory map 400. That is, PCI target B 314 is mapped into the lower two (2) gigabytes (GB) of the four (4) GB address space that is available in a 32-bit address range. The upper 2 GB of address space, designated as region 410 in memory map 400, is not accessible by a SAC and hence it is not used in this address scheme. Accordingly, 32-bit PCI target B 314 will not respond to a target address over 2 GB, Thus, in accordance with the present invention, a most significant bit is used incorporated into a 64-bit address to uniquely identify it as such so that a 32-bit target will recognize it and not respond (e.g., assert a claim to the transaction). By using this prescribed format for the SAC address scheme for a 64-bit target address, address aliasing is prevented for 64-bit addresses sent using a SAC in a system that comprises both 64-bit targets and 32-bit targets.

Figure 5:
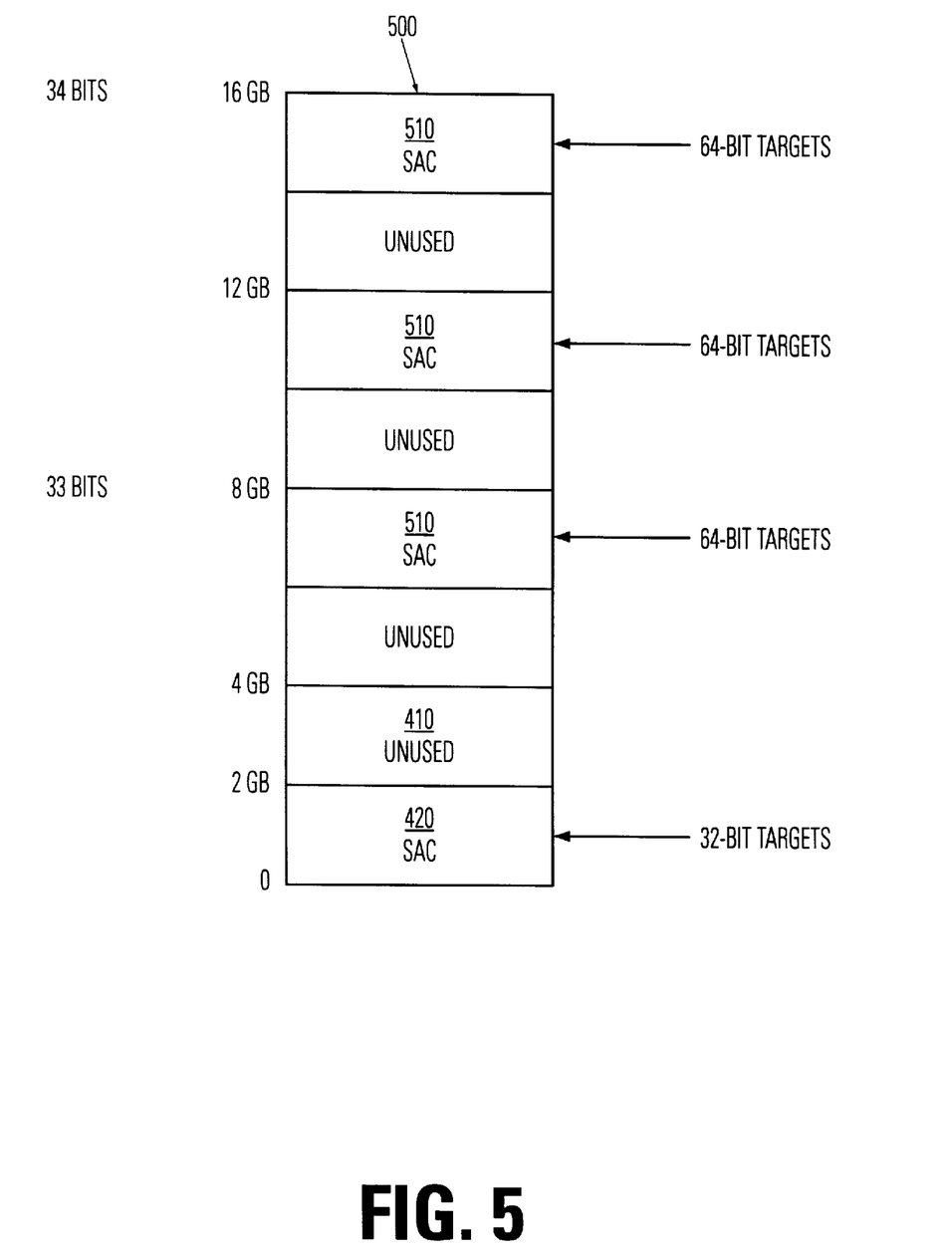
FIG. 5 is an illustration of a portion of a 64-bit memory map in accordance with one embodiment of the present invention.

With reference now to FIG. 5, memory map 500 in accordance with the present embodiment of the present invention is shown. Memory map 500 represents a 64-bit address range; however, only a portion of memory map 500 corresponding to a target address in the range of 34 or fewer bits is shown.

As described above, for a 64-bit target requiring a 64-bit address, in the present embodiment the most significant bit, address bit 31, is set equal to one to indicate that the address is a 64-bit address. Thus, in accordance with the present invention, 64-bit targets are mapped into each region 510 in memory map 500 using a SAC. As described above, 32-bit targets are mapped into region 420 using a SAC to transmit the 32-bit address. If FIG. 5 is extrapolated out to illustrate all 64 bits in memory map 500, then 64-bit targets would be mapped into the upper 2 GB address space (represented by each region 510) of each 4 GB interval. The lower 2 GB address space each 4 GB interval above 4 GB and region 410 are not accessible using a SAC because AD[31] is set equal to zero to indicate that the address is a 32-bit address; hence, that space is unused in this address scheme. However, it is appreciated that a tremendous amount of address space is available with 64-bit addressing (16 exabytes or $2^{64}$ bytes), and the fact that a portion of this address space is not accessible in this address scheme is offset by the substantial quantity of address space that is accessible and by the advantages gained by eliminating DACs, such as the increased speed at which transactions are accomplished and the optimization of the PCI bus bandwidth.

Therefore, in this embodiment SACs are used to eliminate DACs without causing address aliasing, and the present invention thereby allows 32-bit PCI devices and 64-bit PCI devices to function seamlessly. Also, the present embodiment of the present invention eliminates the unnecessary clock cycle consumed by each DAC by using SACs for all target addresses, thereby optimizing the computer system's functionality and PCI bus bandwidth.

Single and Dual Address Cycles in Combination

Figure 6:
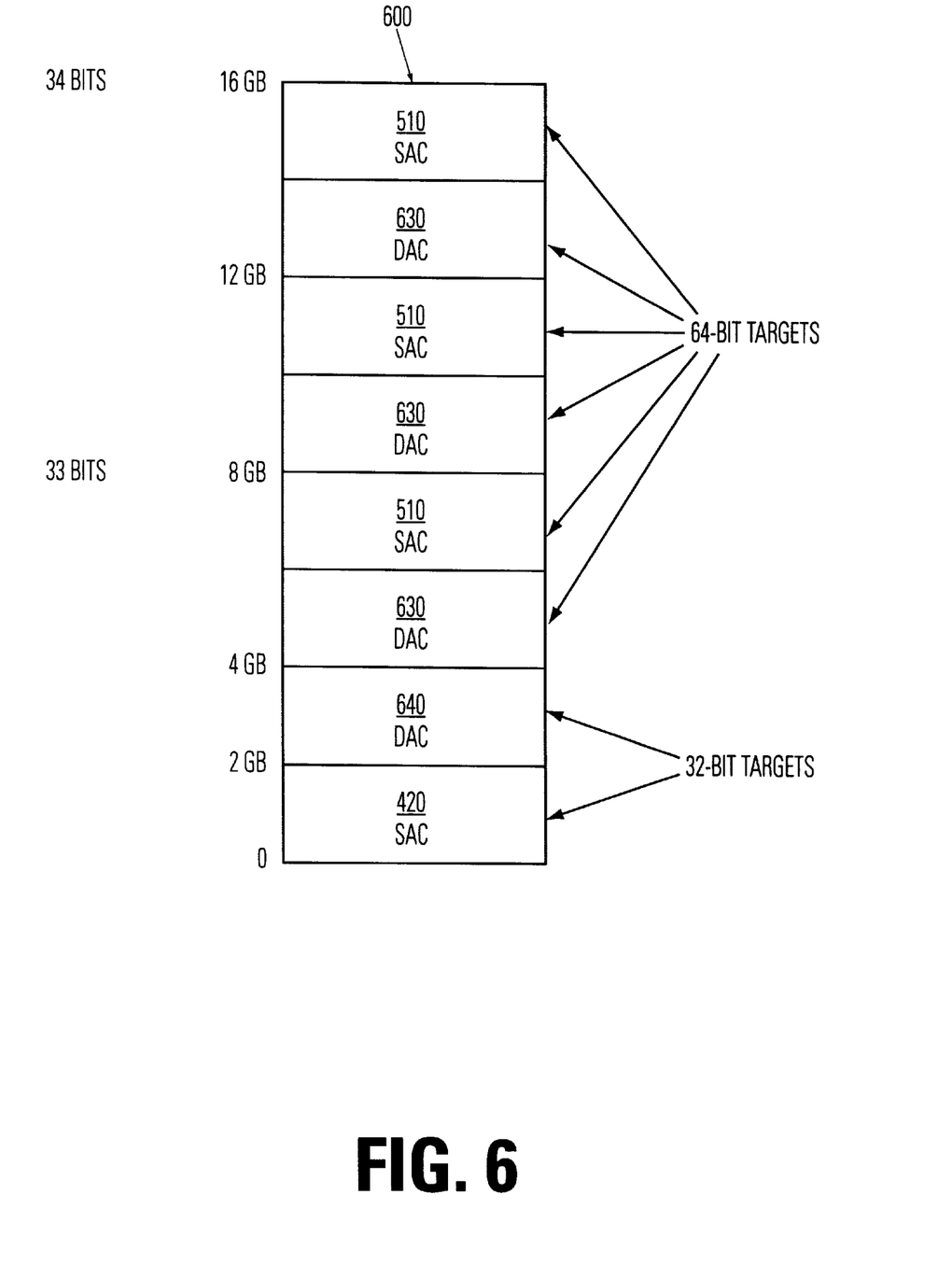
FIG. 6 is an illustration of a portion of a 64-bit memory map in accordance with another embodiment of the present invention.

With reference now to FIG. 6, memory map 600 in accordance with another embodiment of the present invention is shown. Memory map 600 represents a 64-bit address range; however, only a portion of memory map 600 corresponding to a target address in the range of 34 or fewer bits is shown.

As described in conjunction with FIGS. 4 and 5, SACs are used by 64-bit targets requiring 64-bit addresses to access address spaces represented by regions 510. As above, a SAC is also used by 32-bit targets with 32-bit addresses to access address spaces represented by region 420.

In this embodiment of the present invention, the address scheme uses DACs in addition to SACs to permit access to the memory locations that are not accessible using SACs, as explained above in conjunction with FIG. 5. Thus, in this embodiment, DACs permit access to regions 630 and, in combination with SACs, permit access to the entire memory map 600 without address aliasing.

Region 640 is in the 32-bit target address range; that is, it is normally accessible using a 32-bit target address. Thus, a SAC is normally used to transmit the 32-bit target address associated with region 640. However, as described above, region 640 is made inaccessible using a SAC by purposely assigning a value of zero to the most significant bit, address bit [31]. Therefore, in accordance with this embodiment of the present invention, in this address scheme a DAC is created according to a prescribed format in order to allow access to region 640 of FIG. 6. In this address scheme, the DAC, for accessing region 640 is formatted so that all of the upper 32 bits of the target address are each purposely assigned a value of zero.

Thus, in accordance with the present invention, a target device receives the upper portion of the target address in one cycle of the DAC. If all of the upper 32 bits of the target address are equal to zero, the target device maps the target address to region 640. Otherwise, if all of the upper 32 bits of the target address are not equal to zero, then the DAC represents a typical target address which is read and mapped in the typical fashion to one of regions 630.

Therefore, in this embodiment, SACs and DACs are used to gain access to all address spaces in memory map 600 of FIG. 6. In addition, in this embodiment SACs reduce the number of DACs needed to access memory map 600; as can be seen from FIG. 6, the number of addresses requiring a DAC are reduced by one-half. Thus, in this embodiment, the present invention reduces by one-half the unnecessary clock cycles consumed by DACs, thereby optimizing the computer system's functionality and PCI bus bandwidth and freeing up clock cycles for other transactions on the PCI bus. In addition, when SACs are used for 64-bit addresses as described previously herein, address aliasing is prevented in accordance with the present invention, and so this embodiment of the present invention allows 32-bit PCI devices and 64-bit PCI devices to function seamlessly.

Figure 7:
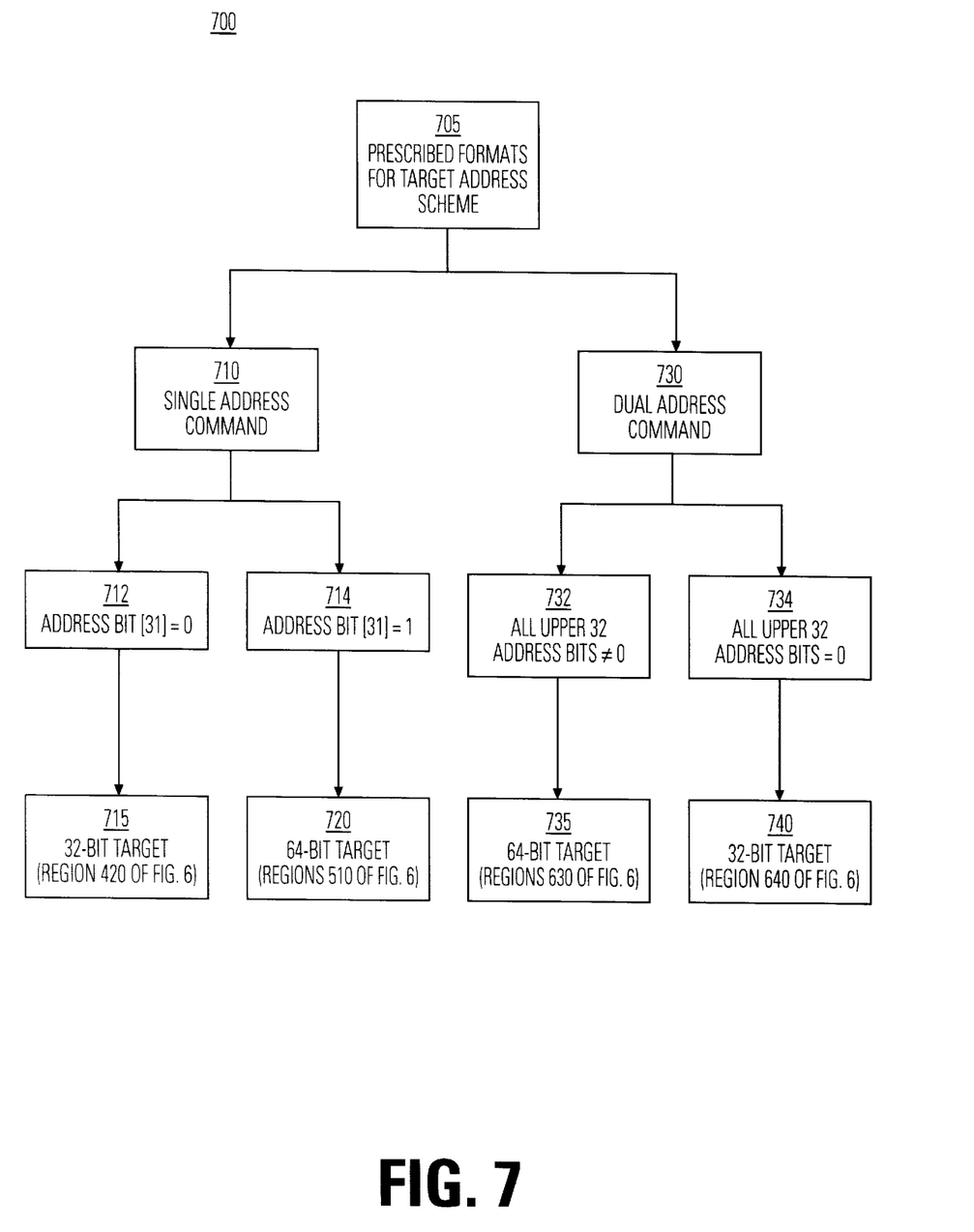
FIG. 7 is a diagram illustrating the address schemes used in accordance with one embodiment of the present invention.

With reference now to FIG. 7, diagram 700 illustrates the address schemes used for target addresses in accordance with the present embodiment. As described above, a SAC 710 or DAC 730 is used in accordance with the present invention, depending on the address scheme appropriate for the target address. A SAC 710 is used for both 32-bit target addresses and 64-bit target addresses. A DAC 730 is used for 64-bit target addresses including the target address mapped into region 640 of FIG. 6.

In box 705, prior to transmitting the target address, the PCI initiator device (e.g., PCI initiator 310 of FIG. 3) first must specify which address scheme is appropriate for the target address. That is, for example, a target address located in region 510 of FIG. 6 is most readily accessed using a SAC, and so PCI initiator 310 first makes a determination so as to use the appropriate address scheme and to configure the target address according to the prescribed format for that address scheme.

In one embodiment, PCI initiator device 310 determines the appropriate address scheme by decoding and reading the target address. PCI initiator 310 thereby knows the target address and thus the location of the address within the memory map (e.g., memory map 600 of FIG. 6). The type of address scheme is clearly delineated by region in memory map 600 and so PCI initiator device 310 is able to specify the appropriate address scheme corresponding to the target address.

In another embodiment, the target address is used as an index identifying an entry in a lookup table. In this embodiment, PCI initiator 310 uses the target address as an index. The entry in the lookup table associated with each indexed target address specifies the address scheme to be used for that target address. The lookup table is readily updated and thus is a flexible as well as a fast approach for specifying the appropriate address scheme.

It is understood that other methods may be used in accordance with the present invention to identify the address scheme to be used to format the target address in the manner prescribed for each address scheme.

As shown in box 712 and box 714 of chart 700, in accordance with the present embodiment, the most significant bit (address bit [31]) is assigned a value of either zero or one for the address scheme prescribed for SAC 710. If a value of zero is assigned to AD[31], this indicates that the target address is a 32-bit target address and is mapped into region 420 of FIG. 6 (box 715). If a value of one is assigned to AD[31], this indicates that the target address is a 64-bit target address and is mapped into regions 510 of FIG. 6 (box 720). In accordance with the present invention, a value of zero cannot be used for AD[31] for a 64-bit target address.

As shown in box 732 and box 734 of diagram 700, in accordance with the present embodiment, each of the upper 32-bits of the target address either are all assigned a value of zero for the address scheme prescribed for DAC 730 or they are not. If they are not all assigned a value of zero, then they are assigned a value according the normal fashion in the art for indicating a target address, and DAC 730 is used for access to regions 630 of FIG. 6 (box 735). If all 32 bits are assigned a value of zero, the target address is mapped into region 640 of FIG. 6 (box 740).

Thus, the address schemes used in accordance with this embodiment of the present invention permit access to the entire range of memory map 600. This embodiment of the present invention uses SACs to significantly reduce the number of DACs needed to access memory map 600, thereby optimally utilizing the data transfer bandwidth of a computer system.

Memory Mapping Method

Figure 8:
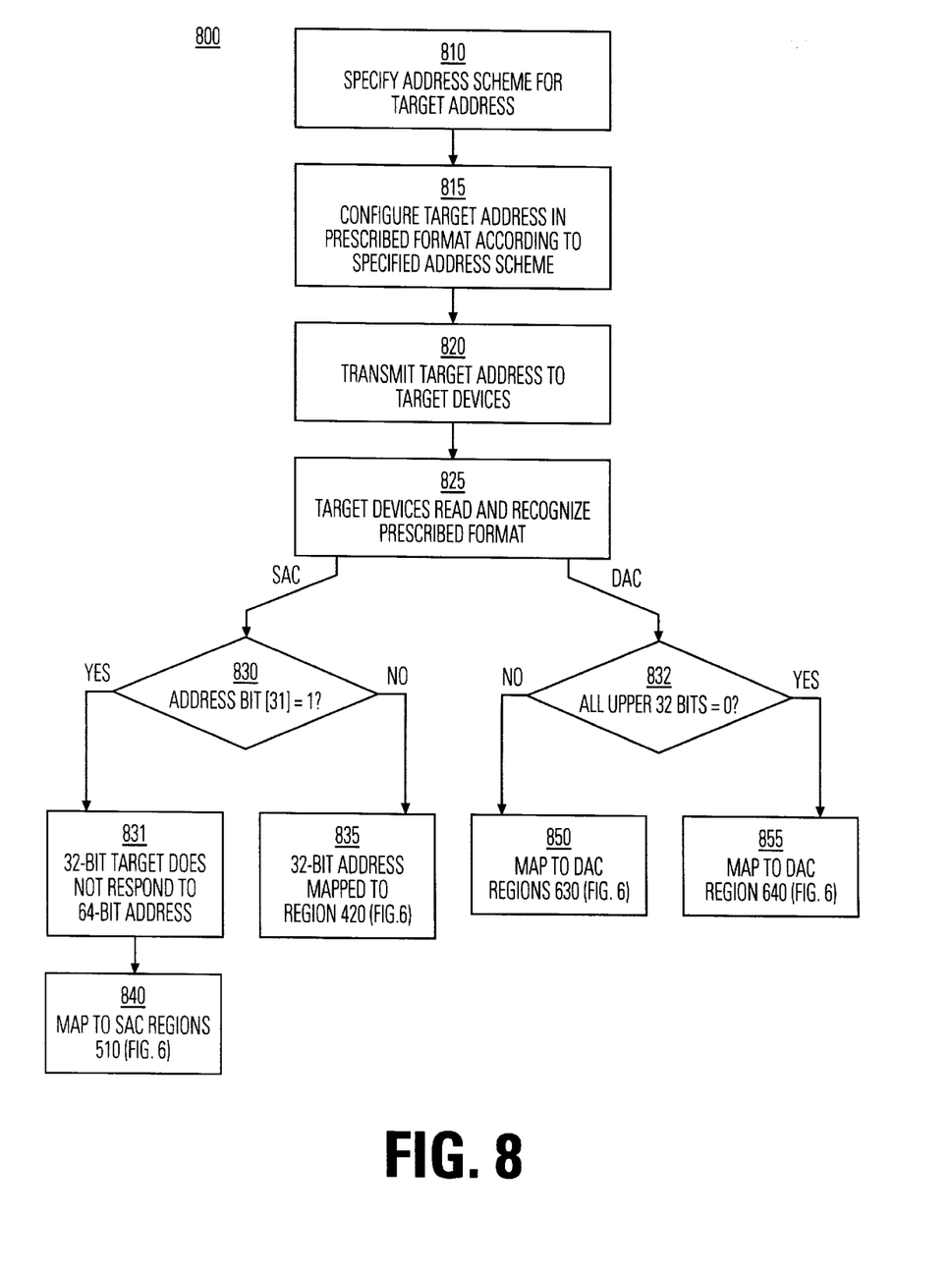
FIG. 8 is a flowchart of the process used for accessing a target address in accordance with one embodiment of the present invention.

FIG. 8 provides a flowchart of process 800 implemented in accordance with the present invention in order to permit the use of SACs with 64-bit addresses to eliminate or reduce DACs without address aliasing. Process 800 is implemented in a PCI initiator and a PCI target device (e.g., PCI initiator 310 and PCI target B 314, respectively, of FIG. 3); for example, process 800 is encoded in an integrated circuit in these devices or, alternatively, is programmed into these devices using software.

In step 810 of FIG. 8, in accordance with the present invention, PCI initiator 310 specifies which address scheme is appropriate for the target address; that is, PCI initiator 310 first determines whether a SAC or DAC should be used based on the location of the target address in memory map 600 of FIG. 6. In one embodiment described previously herein, only SACs are used and therefore PCI initiator 310 does not need to implement step 810 for that embodiment.

One method for determining the appropriate address scheme is for PCI initiator 310 to decode the target address before it is transmitted. By decoding the target address, PCI initiator 310 determines which address space of memory map 600 the target address is mapped to. The address scheme associated with that address space is clearly delineated so PCI initiator 310 specifies the appropriate address scheme accordingly.

Another method for determining the appropriate address scheme is for PCI initiator 310 to use the target address (without decoding it) as an index to an entry in a lookup table. Each target address is unique and thus provides a unique pointer to an entry in the lookup table. Each entry in the lookup table specifies the address scheme to be used for that target address.

In accordance with the present invention, other methods may be used by PCI initiator 310 to specify the appropriate address scheme, either SAC or DAC. If a DAC is to be used, the type of DAC is also specified (that is, a DAC associated with regions 630 or a DAC associated with region 640 of FIG. 6). Similarly, if a SAC is to be used, the type of SAC is also specified (that is, a SAC associated with regions 510 or a SAC associated with region 420 of FIG. 6).

In step 815 of process 800, PCI initiator 310 configures the target address according to the format prescribed for the specified address scheme, as illustrated by diagram 700 of FIG. 7. In one embodiment of the present invention, a combination of SACs and DACs are used to enable access to all regions of memory map 600 of FIG. 6. In that embodiment, the prescribed format for a SAC for a 32-bit target address associated with region 420 of FIG. 6 requires that the most significant bit of the target address, address bit [31], be assigned a value of zero. The prescribed format for a SAC for a 64-bit target address associated with regions 510 of FIG. 6 requires that address bit [31] of the target address be assigned a value of one. The prescribed format for a DAC for a 64-bit target address associated with region 640 of FIG. 6 requires that all upper 32 bits of the target address are each assigned a value of zero. For a DAC for a 64-bit address associated with regions 630 of FIG. 6, the target address is formatted in the typical manner used in the PCI system architecture.

Referring still to step 815, in another embodiment of the present invention, only SACs are used as described previously herein. Accordingly, for that embodiment, target addresses are only formatted in the manner described for the SAC address scheme.

Referring now to step 820 of FIG. 8, PCI initiator 310 transmits the target address to the target devices on the PCI bus (e.g., PCI bus 320 of FIG. 3). When a SAC is used to transmit the target address, the target address is sent during one clock cycle; when a DAC is used, the target address is sent during two clock cycles. Hence, in accordance with the present invention, for each transaction using a SAC to transmit a 64-bit target address, a clock cycle is saved. In one embodiment, all 64-bit target addresses are transmitted using SACs, thereby eliminating DACs and reducing the length of all transactions by one clock cycle. In another embodiment, a combination of SACs and DACs are used to transmit 64-bit target addresses, reducing the length of approximately one-half of all transactions by one clock cycle. Considering the number of transactions that occur in a PCI system, these embodiments of the present invention each result in a substantial reduction in clock cycles needed for transmitting target addresses, thereby optimizing the data transfer bandwidth of the PCI bus.

In step 825, each of the target devices on PCI bus 320 receives the target address from PCI initiator 310, then decodes and reads the target address. Each PCI target device then determines the address scheme used for the target address from the format of the target address. Thus, each PCI target device is able to determine whether a SAC or a DAC is being used for the target address, and whether the target address has a range of 32-bits or 64-bits.

If a SAC is being used, then process 800 continues to step 830. If a DAC is being used, then process 800 continues to step 832.

In step 830, each of the target devices on PCI bus 320 reads the target address and determines whether or not address bit [31] is equal to one. All PCI target devices, whether 32-bit or 64-bit devices, have access to address bit [31].

In step 831, 32-bit target devices recognize that address bit [31] is one and therefore the target address is a 64-bit address. Hence, 32-bit target devices do not respond to the target address, thereby preventing address aliasing.

In step 832, each of the target devices on PCI bus reads the target address and determines whether or not all upper 32 bits of the target address are equal to zero. Because the target address is transmitted via a DAC, all PCI target devices, whether 32-bit or 64-bit devices, have access to the entire target address.

In accordance with the present invention, at this point of process 800 each of the PCI targets know the type of target address they are dealing with; that is, they know whether or not the target address is represented by a SAC or a DAC, and they know if the target address is a 64-bit address or a 32-bit address. They are thereby able to determine whether or not they are the target device named by the target address. The target device named by the target address asserts a claim to the transaction according to the PCI specification. Thus, in accordance with the present invention, address aliasing is prevented and only a single target device asserts a claim to the target address.

In step 835, if address bit [31] is not equal to one, the target address is mapped to region 420 of FIG. 6.

In step 840, if address bit [31] is equal to one, the target address is mapped to regions 510 of FIG. 6.

In step 850, if all upper 32 bits of the target address are not equal to zero, then the target address is mapped to regions 630 of FIG. 6.

In step 855, if all upper 32 bits of the target address are equal to zero, then the target address is mapped to region 640 of FIG. 6.

The present invention thus provides a method for formatting target addresses in a manner that uniquely identifies the address scheme of the target address and that is readily understood by a target device, allowing the target device to correctly access the proper location in memory without address aliasing.

Figure 9:
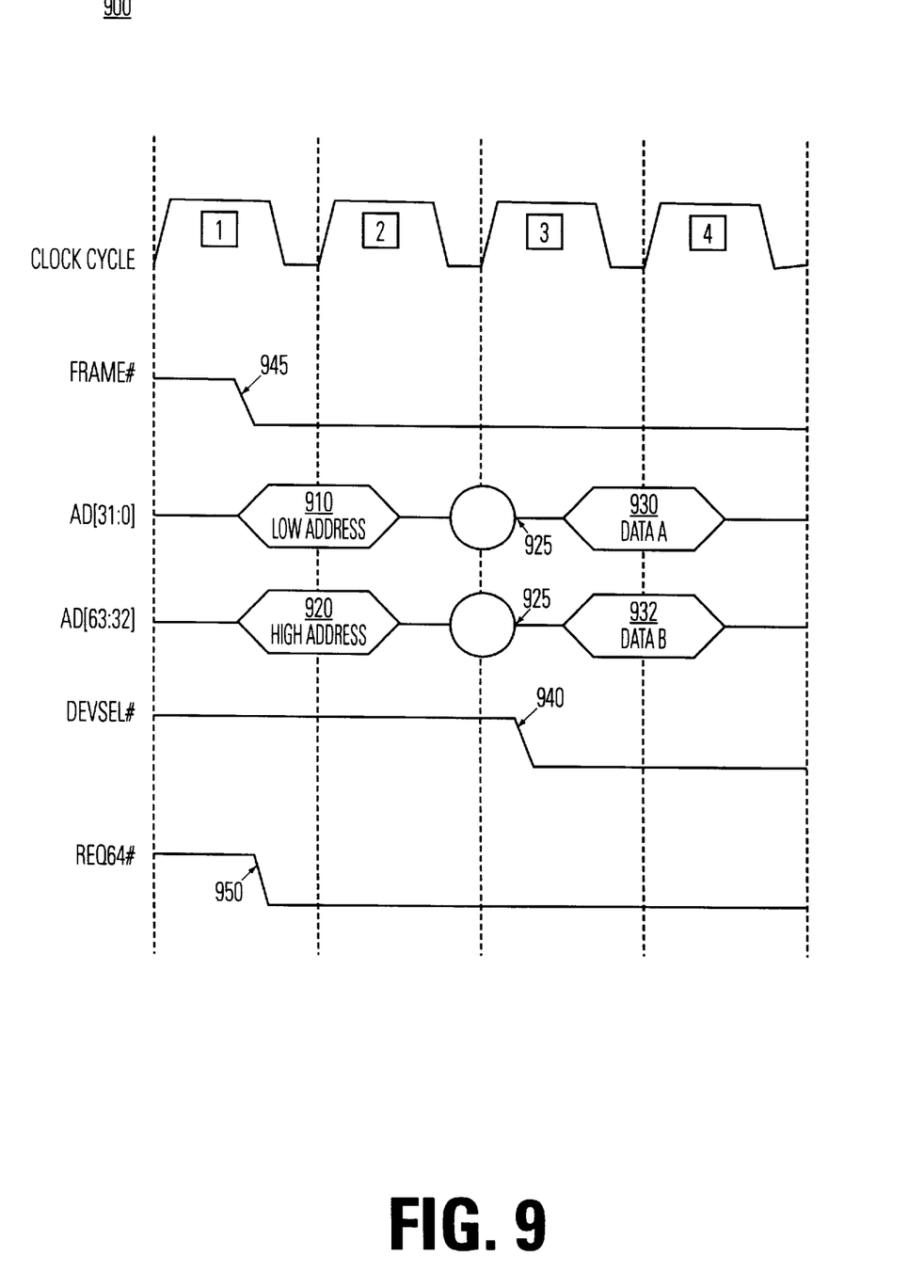
FIG. 9 illustrates a timing diagram for a 64-bit target and a 64-bit address in accordance with one embodiment of the present invention.

FIG. 9 is an illustration of timing diagram 900 exemplifying a 64-bit transaction between a 64-bit initiator device (e.g., PCI initiator 310 of FIG. 3) and a 64-bit target (e.g., PCI target A 312 of FIG. 3) in accordance with the SAC address scheme of the present invention. For simplicity, FIG. 9 does not include all of the signals associated with a transaction, but only shows those signals pertaining to the discussion herein.

PCI initiator 310 starts the transaction on the rising edge of PCI clock cycle 1 by asserting the FRAME# and REQ64# signals at points 945 and 950, respectively. Also in clock cycle 1, in accordance with the present invention, using a SAC, PCI initiator 310 drives the lower portion of the target address (e.g., low address 910) and the upper portion of the target address (e.g., high address 920) onto PCI bus 320 (FIG. 3) over AD[31:0] and AD[63:32], respectively. PCI target A 312 receives both portions of the target address and decodes the target address in clock cycle 2. Recognizing the target address as its address, PCI target A 312 claims the transaction by asserting DEVSEL# in clock cycle 3 at point 940. If necessary, turn-around cycles 925 are inserted during clock cycle 3, and data A 930 and B 932 are then driven onto PCI bus 320 by either PCI initiator 310 or PCI target A 312, depending on the type of transaction (e.g., a read transaction or a write transaction). Thus, as shown by FIG. 9, the present invention allows the address cycle to be completed and the transfer of data to occur one clock cycle sooner than possible when DACs are used to transmit a 64-bit address.

Figure 10:
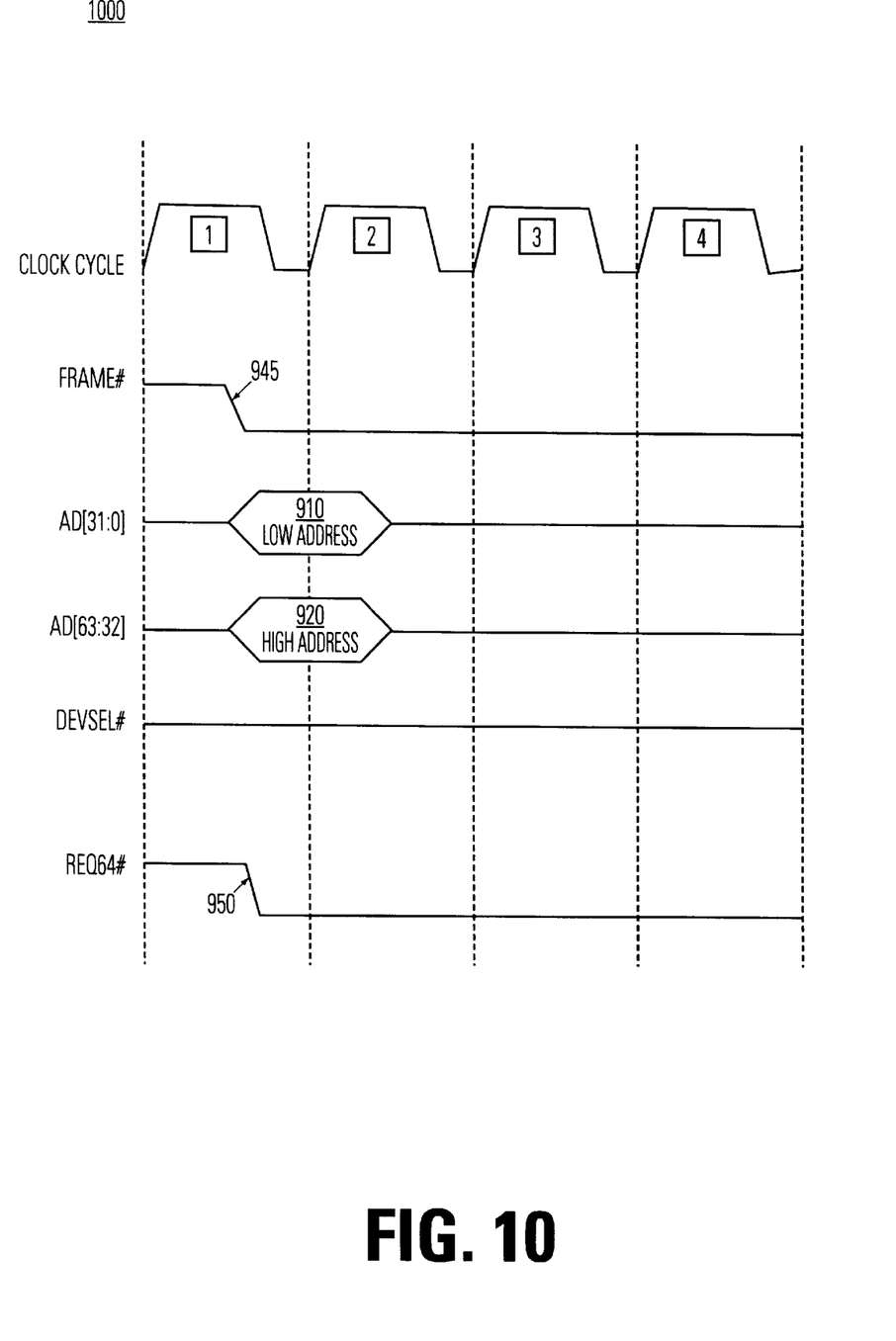
FIG. 10 illustrates a timing diagram for a 32-bit target and a 64-bit address in accordance with one embodiment of the present invention.

FIG. 10 is an illustration of timing diagram 1000 exemplifying a 64-bit transaction between a 64-bit initiator device (e.g., PCI initiator 310 of FIG. 3) and a 32-bit target (e.g., PCI target B 314 of FIG. 3) in accordance with the SAC address scheme of the present invention. For simplicity, FIG. 10 does not include all of the signals associated with a transaction, but only shows those signals pertaining to the discussion herein.

In the same manner as that described above in conjunction with FIG. 9, PCI initiator 310 starts the transaction on the rising edge of PCI clock cycle 1 by asserting the FRAME# and REQ64# signals at points 945 and 950, respectively. Also in clock cycle 1, in accordance with the present invention, PCI initiator 310 uses a SAC to drive the lower portion of the target address (e.g., low address 910) and the upper portion of the target address (e.g., high address 920) onto PCI bus 320 (FIG. 3) over AD[31:0] and AD[63:32], respectively. PCI target B 314 receives AD[31:0] and, in accordance with the present invention, detects that the address bit AD[31] is equal to one. Consequently, PCI target B 314 recognizes that the target address is a 64-bit address. Consequently, PCI target B 314 does not assert DEVSEL# to claim the transaction. Thus, as shown by FIG. 10, the present invention allows a 64-bit address to be transmitted using a SAC in a system comprising both 64-bit and 32-bit targets; however, in accordance with the present invention, the 32-bit targets do not respond to the address, thereby precluding the occurrence of address aliasing, bus contention, and the like.

The present invention thus provides a system and method that prevent address aliasing when using a SAC to transmit a target address in a computer system comprising target devices having addresses of different sizes. The present invention optimally utilizes the data transfer bandwidth of a computer system by eliminating or reducing the unnecessary expenditure of clock cycles associated with DACs. The present invention also provides a method and system that do not cause address aliasing and other errors associated with address aliasing.

The preferred embodiment of the present invention, memory mapping method for eliminating dual address cycles to increase PCI bus bandwidth, is thus described. While the present invention has been described in particular embodiments, it should be appreciated that the present invention should not be construed as limited by such embodiments, but rather construed according to the following claims.

What is claimed is:

1. In a computer system comprising a plurality of devices, a system for preventing address aliasing between said plurality of devices, said system comprising:

a bus;

an initiator device coupled to said bus;

a first target device coupled to said bus, said first target device having a first address in a first address range, wherein said first address range includes 64-bits, said first address is a 64-bit address, and said first target device is a 64-bit device;

a second target device coupled to said bus, said second target device having a second address in a second address range, wherein said second address range includes 32-bits, said second address is a 32-bit address, and said second target device is a 32-bit device;

said second address range comprising addresses that are specified according to a first prescribed value for a most significant bit; and said first address range comprising addresses that are specified according to a second prescribed value for said most significant bit to exclude said second address range such that said initiator device can transmit said first address to said first target device without aliasing said second address with said first address; and wherein said second address range comprises a lower half of a four gigabyte address space that is addressed by said second address using a single address cycle when said first prescribed value for said most significant bit is zero and further comprises an upper half of said four gigabyte address space that is addressed by said second address using a dual address cycle (DAC), with all upper 32 bits of said DAC set to zero.

2. The system of claim 1 wherein said most significant bit is address bit (31).

3. The system of claim 1 wherein said first address range comprises an upper half of a four gigabyte address space that is addressed by said first address using a single address cycle when said second prescribed value for said most significant bit is one.

4. The system of claim 3 wherein said first address range further comprises a lower half of said four gigabyte address space that is addressed by said first address using a dual address cycle.

5. The system of claim 1 wherein said bus, said initiator device, said first target device and said second target device are peripheral component interconnect (PCI) compliant devices.

6. A computer system comprising:

a bus;

an initiator device coupled to said bus;

a first target device coupled to said bus, said first target device having a first address in a first address range, wherein said first address range includes 64-bits, said first address is a 64-bit address, and said first target device is a 64-bit device; and a second target device coupled to said bus, wherein said second target device having a second address in a second address range, wherein said second address range includes 32-bits, said second address is a 32-bit address, and said second target device is a 32-bit device;

said second address range comprising addresses that are specified according to a first prescribed value for a most significant bit;

said first address range comprising addresses that are specified according to a second prescribed value for said most significant bit to exclude said second address range; and said initiator device adapted to select an address range for a target address by specifying said first prescribed value for said most significant bit in said second address and by specifying said second prescribed value for said most significant bit in said first address, thereby preventing address aliasing; and wherein said second address range comprises a lower half of a four gigabyte address space that is addressed by said second address using a single address cycle when said first prescribed value for said most significant bit is zero and further comprises an upper half of said four gigabyte address space that is addressed by said second address using a dual address cycle (DAC), with all upper 32 bits of said DAC set to zero.

7. The computer system of claim 6 wherein said most significant bit is address bit (31).

8. The computer system of claim 6 wherein said first address range comprises an upper half of a four gigabyte address space that is addressed by said first address using a single address cycle when said second prescribed value for said most significant bit is one.

9. The computer system of claim 8 wherein said first address range further comprises a lower half of said four gigabyte address space that is addressed by said first address using a dual address cycle.

10. The computer system of claim 6 wherein said bus, said initiator device, said first target device and said second target device are peripheral component interconnect (PCI) compliant devices.

11. The computer system of claim 6 wherein said initiator device selects said address range by decoding said target address.

12. The computer system of claim 6 wherein said initiator device selects said address range by using said target address as an index in a lookup table.

13. A method for preventing address aliasing when transmitting a 64-bit target address from an initiator device to a target device in a computer system comprising a 64-bit target device and a 32-bit target device, said method comprising the steps of:

a) using a first prescribed value for a most significant bit to specify a 32-bit address range for said 32-bit target device;

b) using a second prescribed value for said most significant bit to specify a 64-bit address range for said 64-bit target device, said 64-bit address range specified to exclude said 32-bit address range;

c) selecting a range for a target address by specifying a value for said most significant bit in said target address, wherein said most significant bit is specified to be said first prescribed value to indicate said target address is a 32-bit target address and said second prescribed value to indicate said target address is said 64-bit target address; and d) transmitting said target address to said 32-bit target device and said 64-bit target device, where only said 64-bit target device responds to said target address when said most significant bit is said second prescribed value; and wherein said 32-bit address range comprises a lower half of a four gigabyte address space that is addressed by said target address using a single address cycle when said first prescribed value for said most significant bit is zero and further comprises an upper half of said four gigabyte address space that is addressed by said target address using a dual address cycle (DAC)H with all upper 32 bits of said DAC set to zero.

14. The method of claim 13 wherein said 64-bit target device, said 32-bit target device, and said initiator device are peripheral component interconnect (PCI) compliant devices.

15. The method of claim 13 wherein said most significant bit is address bit (31).

16. The method of claim 13 wherein said 64-bit address range comprises an upper half of a four gigabyte address space that is addressed by said target address using a single address cycle when said second prescribed value for said most significant bit is one.

17. The method of claim 16 wherein said 64-bit address range further comprises a lower half of said four gigabyte address space that is addressed by said target address using a dual address cycle.

18. The method of claim 13 wherein step c) further comprises selecting said range for said target address by decoding said target address.

19. The method of claim 13 wherein step c) further comprises selecting said range for said target address by using said target address as an index in a lookup table.

20. In a computer system comprising a plurality of devices, a system for preventing address aliasing between said plurality of devices, said system comprising:

a bus;

an initiator device coupled to said bus;

a first target device coupled to said bus, said first target device having a first address in a first address range, wherein said first address range includes 64 bits, said first address is a 64-bit address, and said first target device is a 64-bit device;

a second target device coupled to said bus, said second target device having a second address in a second address range, wherein said second address range includes 32 bits, said second address is a 32-bit address, and said second target device is a 32-bit device;

said second address range comprising addresses that are specified according to a first prescribed value for a most significant bit;

said first address range comprising addresses that are specified according to a second prescribed value for said most significant bit to exclude said second address range such that said initiator device can transmit said first address to said first target device without aliasing said second address with said first address; and wherein said first address range comprises an upper half of a four gigabyte address space that is addressed by said first address using a single address cycle when said second prescribed value for said most significant bit is one and further comprises a lower half of said four gigabyte address space that is addressed by said first address using a dual address cycle (DAC).

21. The system of claim 20, wherein said second address range comprises a lower half of a four gigabyte address space that is addressed by said second address using a single address cycle when said first prescribed value for said most significant bit is zero.

22. The system of claim 21, wherein said second address range further comprises an upper half of said four gigabyte address space that is addressed by said second address using a dual address cycle (DAC), wherein all upper 32 bits of said DAC are zero.

23. The system of claim 20 wherein said most significant bit is address bit (31).

24. The system of claim 20 wherein said bus, said initiator device, said first target device and said second target device are peripheral component interconnect (PCI) compliant devices.

25. A computer system comprising:

a bus;

an initiator device coupled to said bus;

a first target device coupled to said bus, said first target device having a first address in a first address range, wherein said first address range includes 64 bits, said first address is a 64-bit address and said first target device is a 64-bit device;

a second target device coupled to said bus, said second target device having a second address in a second address range, wherein said second address range includes 32 bits, said second address is a 32-bit address, and said second target device is a 32-bit device;

said second address range comprising addresses that are specified according to a first prescribed value for a most significant bit;

said first address range comprising addresses that are specified according to a second prescribed value for said most significant bit to exclude said second address range; and said initiator device adapted to select an address range for a target address by specifying said first prescribed value for said most significant bit in said second address and by specifying said second prescribed value for said most significant bit in said first address, thereby preventing address aliasing; and wherein said first address range comprises an upper half of a four gigabyte address space that is addressed by said first address using a single address cycle when said second prescribed value for said most significant bit is one and further comprises a lower half of said four gigabyte address space that is addressed by said first address using a dual address cycle (DAC).

26. The computer system of claim 25, wherein said second address range comprises a lower half of a four gigabyte address space that is addressed by said second address using a single address cycle when said first prescribed value for said most significant bit is zero.

27. The computer system of claim 26, wherein said second address range further comprises an upper half of said four gigabyte address space that is addressed by said second address using a dual address cycle (DAC), wherein all upper 32 bits of said DAC are zero.

28. The computer system of claim 25 wherein said most significant bit is address bit (31).

29. The computer system of claim 25 wherein said bus, said initiator device, said first target device and said second target device are peripheral component interconnect (PCI) compliant devices.

30. The computer system of claim 25 wherein said initiator device selects said address range by decoding said target address.

31. The computer system of claim 25 wherein said initiator device selects said address range by using said target address as an index in a lookup table.

32. A method for preventing address aliasing when transmitting a 64-bit target address from an initiator device to a target device in a computer system comprising a 64-bit target device and a 32-bit target device, said method comprising the steps of:

a) using a first prescribed value for a most significant bit to specify a 32-bit address range for said 32-bit target device;

b) using a second prescribed value for said most significant bit to specify a 64-bit address range for said 64-bit target device said 64-bit address range specified to exclude said 32-bit address range;

c) selecting a range for a target address by specifying a value for said most significant bit in said target address, wherein said most significant bit is specified to be said first prescribed value to indicate said target address is a 32-bit target address and said second prescribed value to indicate said target address is said 64-bit target address; and d) transmitting said target address to said 32-bit target device and said 64-bit target device, where only said 64-bit target device responds to said target address when said most significant bit is said second prescribed value; and wherein said 64-bit address range comprises an upper half of a four gigabyte address space that is addressed by said target address using a single address cycle when said second prescribed value for said most significant bit is one and further comprises a lower half of said four gigabyte address space that is addressed by said target address using a dual address cycle.

33. The method of claim 32 wherein said 32-bit address range comprises a lower half of a four gigabyte address space that is addressed by said target address using a single address cycle when said first prescribed value for said most significant bit is zero.

34. The method of claim 33 wherein said 32-bit address range further comprises an upper half of said four gigabyte address space that is addressed by said target address using a dual address cycle (DAC), wherein all upper 32 bits of said DAC are zero.

35. The method of claim 32 wherein said 64-bit target device, said 32-bit target device and said initiator device are peripheral component interconnect (PCI) compliant devices.

36. The method of claim 32 wherein said most significant bit is address bit (31).

37. The method of claim 32 wherein step c) further comprises selecting said range for said target address by decoding said target address.

38. The method of claim 32 wherein step c) further comprises selecting said range for said target address by using said target address as an index in a lookup table.

* * * * *